(12) United States Patent
Moyer (10) Patent No.: US 9,779,044 B2
(45) Date of Patent: Oct. 3, 2017

(54) ACCESS EXTENT MONITORING FOR DATA TRANSFER REDUCTION (71) Applicant: William C. Moyer, Dripping Springs, TX (US)

(72) Inventor: William C. Moyer, Dripping Springs, TX (US)

(73) Assignee: NXP USA, Inc., Austin, TX (US)

( * ) Notice: Subject to any disclaimer, the term of this patent is extended or adjusted under 35 U.S.C. 154(b) by 388 days.

(21) Appl. No.: 14/552,704

(22) Filed: Nov. 25, 2014

(65) Prior Publication Data

US 2016/0147660 A1    May 26, 2016

(51) Int. Cl.
*G06F 12/00* (2006.01)
*G06F 13/28* (2006.01)
*G06F 12/0804* (2016.01)
*G06F 12/0842* (2016.01)

(52) U.S. Cl.
CPC .......... *G06F 13/28* (2013.01); *G06F 12/0804* (2013.01); *G06F 12/0842* (2013.01)

(58) Field of Classification Search
CPC ............................... G06F 12/08; G06F 12/023
USPC ........................................................ 711/159
See application file for complete search history.

(56) References Cited

U.S. PATENT DOCUMENTS

| | | | |
|---|---|---|---|
| 4,500,954 A | 2/1985 | Duke et al. | |
| 5,953,530 A | 9/1999 | Rishi et al. | |
| 6,789,172 B2 | 9/2004 | Chauvel et al. | |
| 7,165,018 B2 | 1/2007 | Flores et al. | |
| 7,380,115 B2 | 5/2008 | Maine | |
| 7,895,466 B2 | 2/2011 | Barrow | |
| 2005/0097389 A1* | 5/2005 | Tanaka | G06F 11/1092 714/5.1 |
| 2009/0125647 A1 | 5/2009 | Shasha et al. | |
| 2011/0125974 A1* | 5/2011 | Anderson | G06F 12/084 711/153 |
| 2014/0281243 A1* | 9/2014 | Shalf | G06F 12/0813 711/122 |

* cited by examiner

*Primary Examiner* — Adam M Queler
*Assistant Examiner* — Edmund Kwong (57) ABSTRACT

A data processor system includes a local memory, a processor core, and an extent monitor. The local memory stores a block of data at a task memory location that is exclusive to a particular task during a duration of time. The processor core accesses the task memory location of the local memory during the execution of the particular task, and modifies to the block of data stored in the task memory location. The extent monitor monitors a write operation the processor core to the local memory to determine a first most-extreme address of the task memory location modified by the execution of the particular task during the duration of time. The processor core also executes a write back instruction to write back to a shared memory location less than the entire block of data based upon the most-extreme address.

19 Claims, 3 Drawing Sheets

ACCESS EXTENT MONITORING FOR DATA TRANSFER REDUCTION

FIELD OF THE DISCLOSURE

This disclosure generally relates to data processing, and more particularly to a system and method for transferring data.

BACKGROUND

Generally, data processing systems operate to execute program instructions to perform various data processing operations. As such, a particular core of a data processing system can be assigned to execute a program that processes a particular set of data. This combination of a program and corresponding data represents a specific task that is to be executed by the data processing system, and in particular, once assigned, this task represents a specific task of that core. Each core of a data processing system can be assigned multiple tasks.

A task can be divided into one or more portions that are referred to as jobs. When a task has multiple jobs, each job represents an operation of the task that is performed without being interrupted by a task switch. A job can be executed by a core, a non-core resource, or a combination thereof. For example, a core executing a task program can transfer control of a particular job of the task to a hardware accelerator. Note that when control of a job is transferred to a non-core resource, the core that was executing the task program may no longer need to actively process the job. In this situation, the core can be released from execution of the current task's job, and can be used to execute a job from another task. When the non-core resource is finished executing its assigned job, a next job of the original task can be scheduled for execution.

A core can implement a task switch, e.g., switch between tasks, on job boundaries, that is, after completion of one job and before starting a next job. For example, a task scheduler can determine the next job to assign to a core once it completes a current job. Task switching provides a benefit of enabling a core to execute multiple tasks in a time-sliced manner.

When switching between tasks, a core typically stores context information, e.g., state information, of its current task before exiting the current task. The process of saving a particular core's context information for an executing task, and loading stored context information associated with a next task to be processed by the core, is generally referred to as context or task switching.

Similarly, during task execution, each task of a data processor system can be associated with a corresponding region of memory that is unique from other tasks' regions of memory. Often, these unique regions of memory reside in a common memory resource of the data processor system. To facilitate operation, a task's unique region of memory can be loaded from the shared memory to local memory of a core to facilitate faster access speeds. Because the local copy of memory can be modified by its task, it may be necessary to maintain coherency between the copy of core's memory region that is in local memory and the copy of the core's memory region that is in shared memory. Hardware-based cache coherency techniques, such as a MESI (Modified-Exclusive-Shared-Invalid) protocol-based technique, can be used to ensure that any data copied to a local memory from the shared memory resource is properly updated before the data is provided to another source, such as another cache. However, applications having a large number of tasks being executed can preclude the use of traditional cache coherency hardware, by virtue of the amount of required overhead and complexity.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A task-based data processor system is disclosed having one or more processor cores, and various other devices to support operation of the processor cores, and in particular, to support execution of tasks. Such a system can, for example, include a work flow scheduler and a task ordering manager. As task data becomes available, the work scheduler of the processor determines a corresponding program (task program) that will process the task data, and assigns the program ID of the task program and the task data combination to a task identifier (task ID) of a processor core, along with initial ordering information that is used by the core to determine when to execute the task, allowing execution of jobs of a task to be "ordered" with respect to execution of jobs of other tasks.

A processor core waits to execute a particular task until the task is enabled, and until other ordering information indicates it is the particular task's turn to be executed. When an enabled task is selected for execution, its processor core can begin executing the task program from an address associated with the task identifier, which, for a new task, can be included with the initial ordering information, e.g., the program ID associated with the task ID.

The task can include instructions that facilitate a data transfer of a block of working memory data from a global memory region that can include multiple blocks of memory for respective multiple tasks of multiple cores, to a local memory that can support private memory accesses for each task of a particular core. The instructions can facilitate the data transfer through the use of a Direct Memory Access (DMA) controller. The local memory region of a task can be referred to as the task's local private memory; and the global memory region assigned to the task can be referred to as the task's assigned global memory, in that they are intended for exclusive use by the transferring task, until the task decides to return one or more portions or blocks of memory back to the global memory region for subsequent use by another task, or by another job which is executed at a future point in time within the same task.

Tasks generally will utilize a pre-determined portion of the global memory in an exclusive fashion for a period of time needed to complete one or more jobs of the task which are operating on the specific portion of global memory. During this time, the portion of global memory is copied to a private area of task's local memory storage for exclusive use by the task. Following the exclusive use of this block or region of memory, the task returns the block of memory back to the global storage, where it is no longer considered private/assigned to the task. At some future point, another task may be assigned to operate on the block of memory for performing a subsequent processing operation, and will again transfer the block of memory from the global memory region to that task's private local memory for use, and then return the block of memory back to the global memory.

The transfers of these blocks of memory are performed on behalf of a task by the DMA units such that the CPU on which the task resides is available for processing of other task operations, and need not be occupied with the block data transfer overhead. In an embodiment, task local memory accesses may be an order of magnitude faster than global memory accesses, such that the overhead of the transfers of a block of global memory to a local memory block private to the task, and the subsequent transfer back to the global memory of the working block are lower than if the task were to perform all processing accesses directly to the global memory. In addition, the DMA activity can be overlapped with execution of an unrelated task on a CPU in the system, thus improving overall data processing system throughput.

Once the DMA transfer is complete, execution of the task by its assigned core can continue, and access its private local memory as needed, without concern as to whether the contents of the private local memory are available for access by other tasks. During the execution of this phase of the task, the region of memory transferred is considered temporarily private to the task, and resides in the task's local private memory for low-latency access by the task. During execution of the task, an access extent monitor tracks the write accesses by the task to the task's local private memory to keep track of the upper-most and lower-most addresses of the task's local private memory that are written (i.e. modified) by the task. As such, no portion of the task's local private memory outside of the locations (region) defined by the upper-most and lower-most addresses has changed (e.g., been written to) as a result of task execution, and the task can subsequently implement a write back from the local memory to the system global memory of only that potentially modified region of its local private memory bounded by the upper-most and lower-most addresses which were captured by the access extent monitor during the execution of one or more jobs of the task.

As a result, the write back DMA operation to be scheduled by the task after the task has completed all operations on a memory region which had previously been transferred to the local private memory from the global memory by a read DMA transfer, only writes back that sub-portion of its local private memory that may have changed, and, therefore, is more efficient than a write back via a requested DMA transfer that writes the task's entire private memory back to the global memory region. The access extent monitor allows for improved performance by reducing the range of addresses which actually are transferred back to the global memory once the task has finished with use of the memory region. Since modifications to the memory region may in many instances be limited to a small subset of the overall working block, the write DMA transfer may typically be of much smaller size, and thus require fewer system resources and result in reduced system overhead, relative to an embodiment which does not contemplate use of access extent monitoring.

Various embodiments of the present disclosure will be better understood with reference to FIGS. 1-7.

Figure 1:
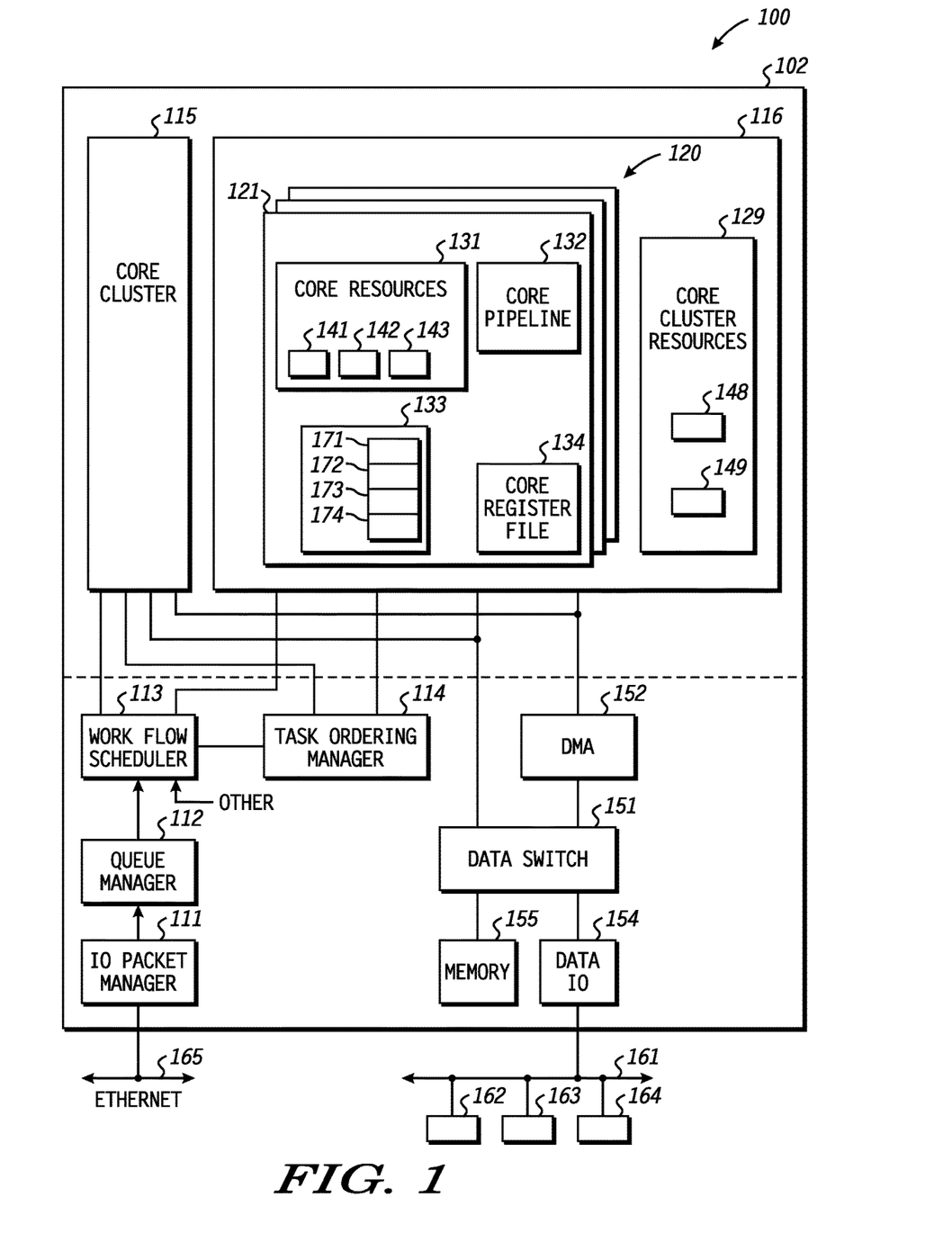
FIG. 1 illustrates, in block diagram form, a data processor system in accordance with at least one embodiment of the present disclosure.

FIG. 1 shows a data processor system 100 of a device in accordance with at least one embodiment of the present disclosure. The data processor system 100 includes various circuit portions including a data processor 102 connected to devices 162-164 via an interconnect 161, and to an Ethernet network 165. The data processor 102 can be an integrated circuit device integrated as a monolithic substrate, such as a semiconductor die, at a package having one or more such monolithic substrates, and the like.

It will be appreciated that the various interconnects disclosed herein are used to communicate information between various devices either directly or indirectly. For example, an interconnect can be implemented as a passive device, such as one or more conductive traces that transmits information directly between various devices, or as an active device that buffers information being transmitted, wherein the information can be stored and retrieved in the process of being communicated between devices, such as at a first-in first-out (FIFO) memory or other memory device. In addition, for convenience, a label illustrated as being associated with either an interconnect can be used herein to also refer to the signal transmitted by the interconnect. For example, it can be stated that an interconnect labeled CK transmits a signal CK, or that a signal CK is transmitted via an interconnect CK.

Data processor 102 includes various circuit portions including an I/O packet manager 111, such as a Wire Rate Input/Output Processor (WRIOP), a queue manager 112, a work flow scheduler 113, a task ordering manager 114, a processor core cluster 115, a processor core cluster 116, a data switch 151, a direct memory access (DMA) controller 152, a data I/O controller 154, and a memory 155. The memory 155 is a system resource of the data processor 102, and therefore is a global memory accessible by each of the core clusters 115 and 116.

The core clusters 115 and 116 can be the same or different. For ease of discussion, it is presumed they are substantially the same. Therefore, for brevity, FIG. 1 illustrates core cluster 116 in greater detail than core cluster 115. As shown, core cluster 116 includes a plurality of processor cores 120 and a core cluster resource 129. The plurality of cores 120 includes core 121. The core cluster resource 129 includes resources that can support each of the plurality of processor cores 120 of core cluster 116. While multiple core clusters are illustrated, it will be appreciated, that in other embodiments the data processor 102 can include a single core cluster, a single core, or a plurality of individual cores.

In an embodiment, the various features or components of processor 102, such as task ordering manager 114, workflow scheduler 113, and the cores 120, can be general purpose or special purpose processors such as state machines, instruction-based processors, other types of logic circuits capable of performing operations, and the like. By way of example, core 121 is presumed to be an instruction-based data processor core.

In operation, the processor 102 can communicate via data switch 151 and interconnect 161 to devices 162-164. For example, one of devices 162-164 can be a system-level memory of data processor system 100, and therefore is a global memory accessible by each of the core clusters 115 and 116. In addition, the processor 102 can receive and provide information packets, such as Ethernet packets, via interconnect 165. By way of example, various tasks are described herein in the context of packet processing. For example, the processor 102 can receive/send data packets, such as Ethernet data packets, from/to other devices via the circuitry labeled I/O packet manager 111. It will be appreciated that in other embodiments tasks can be assigned based upon criteria that is independent of the receipt of packetized data.

Received data packets are classified by the I/O Packet manager 111 and provided to the queue manager 112, which in turn stores data packet information in a queue (not shown). During classification, the I/O Packet manager 111 can evaluate header information of a received data packet to determine program code that is to process the received data packet, and associates a particular program identifier (program ID) of that program code to the data packet that identifies that program. Examples of various programs that can process a data packet include programs that perform decryption, de-compression, compression, and the like. The queue manager 112 can create/remove queues based on the number of packet streams received at the processor 102. Thus, upon being classified, a data packet can be assigned to an existing queue corresponding to a particular existing data stream, or to a newly created queue if the data packet is determined to be the initial data packet of a new data stream.

After a data packet is placed in a queue, the work flow scheduler 113 provides information to a particular core that associates a particular task ID to the data packet information (the task data) and to its corresponding processing program (the task program). Relevant information of each task can be provided to the task ordering manager 114, which maintains various task status information that can be used to determine the state of each task, such as whether a task is assigned to a core, enabled for execution by its core, being executed by its core, and the like. For example, the workflow scheduler 113, can provide information to the task ordering manager 114 when a particular task has been assigned, e.g., data packet information and program information has been associated to a particular task ID of a particular core. In addition, the core 121 can provide task information to the task ordering manager 114 that indicates which task, and job of the task (task/job), is currently executing, as well as other task state information. The task ordering manager 114 can use this information to determine which other tasks can be enabled for execution.

It will be appreciated that with respect to cores having a fixed number of Task IDs, that the term "task" as used herein can generally refer to either assigned or unassigned tasks. For example, the tasks of a core supporting a fixed number n of Task IDs, where n is an integer, are referred to herein as Task1-Taskn. A particular task, such as Task1, is referred to as an unassigned task prior to being associated with a particular task data/program. Thus, Task1 is referred to as an assigned task, e.g., an existing task, once a particular task data/program becomes associated with Task1. It will be appreciated that an unassigned task does not actually refer to an existing task by virtue of not being associated with a task data/program. Thus, an unassigned task more precisely refers to a task identifier that is available to be assigned to a task data/program. In other core architectures that dynamically allocate task identifiers, the term task need not refer to unassigned tasks, as the concept of a Task ID being unassigned would have no meaning.

During execution of a task by its assigned core, the task can access memory 155 directly via data switch 151 by providing data switch 151 access information corresponding to memory 155. Alternatively, the task can access memory 155 indirectly via data switch 151 by configuring DMA 152 with access information indicating a region of memory 155 to be accessed. In a similar manner, a task can access external resources 162-164 via data IO 154, which can include memory and other peripherals, either directly via data switch 151 or indirectly via DMA 152.

Each of the plurality of cores 120 includes various circuit modules. For example, core 121 includes core resources module 131, core pipeline 132, a core memory 133, and core register file 134. The core resources module 131 is illustrated to include modules 141-143, which themselves implement particular operations. For example, one of the modules 141-143 can be a core-specific task extent monitor, as described in greater detail below, while another module can be a core-specific task manager that monitors maintains various task information for the tasks of core 121.

For example, such a core task manager can maintain task information that indicates a state of each task. This state information can be used to control the manner in which tasks are executed relative to each other. For example, the core task manager of a core can include a task table that includes information represented at Table 1, which only illustrates entries for the assigned tasks. According to the embodiment of Table 1, the core's task table is initially provided by workflow scheduler 113 when the task is created. For example, Table 1 illustrates processor core 121 with three assigned tasks, Task1, Task2, and Task3, which have been assigned by the workflow scheduler 113. The column labeled "Task" includes the Task IDs of the Active Tasks.

TABLE 1

Task Table 132 for Processor Core 121 (Time T0)

| Task | Task Data | Inhibit | Job |
| --- | --- | --- | --- |
| Task1 | DP1 | 1 | J1, J2 |
| Task2 | DP2 | 1 | J4, J5 |
| Task3 | DP4 | 1 | J1, J2, J3 |

The column labeled "Task Data" includes an indicator that identifies a location of each task's task data. The column labeled "Inhibit" includes an indicator that indicates whether a particular task is enabled to be executed by its core. For example, an Inhibit indicator having a value of one (1) indicates that a corresponding task cannot be executed by its core at this point in time, while an Inhibit indicator having a value of zero (0) indicates that the corresponding task can be executed by its core at this time. According to an embodiment, whether a task is enabled or disabled is determined by the task ordering manager 114, and communicated to the core. The column labeled "Job" lists the jobs associated with a corresponding task. The first job of the list includes an indicator that identifies a location where instructions reside for the next job to be executed, e.g., indicates from where task program instructions are to be fetched by the core when execution of a next job commences. Note, as jobs are completed they will be struck-through in Table 1, such that the next job that is not struck-through will be considered the first job of the list. Thus, according to Table 1, no jobs have been completed, and therefore none of the Job indicators are struck-through.

A task can include one or more jobs. The jobs of a task can be defined by a task program code based upon the understanding of a programmer or compiler as to the resources used by particular portions of the task program during execution. Once identified, the job boundaries of a task can be indicated in the task program itself through the use of task switch instructions that identify not only the location where a task switch can occur, but a location of a next job as well. For example, referring to Table 1, the last instruction of job J1 of Task0 could be <TaskSwitch J2>, which is a task switch instruction having an operand J2 that is used to identify the beginning of job J2, of Task0. Thus, neither the processor core executing a task, nor the task ordering manager need to have a priori knowledge as to the identity of a task's jobs.

According to Table 1, the current state of the core is such that none of TASK1-TASK3 are enabled for execution as indicated by their respective inhibit indicators having a value of one (1). Once enabled and executed, Task1 will process task data associated with identifier DP1 (task data DP1) by executing the initial job J1, as listed in the Job column of Table 1. Similarly, when executed, Task2 will process task data DP2 by executing task job J4 followed by executing task job J5, and Task3 will process task data DP4 by executing job J1 at core 132, followed by job J2, and then job J3.

The core memory 133, which is local to the core 121, can be accessed by the various tasks executed by the core pipeline 132. The core memory 133 of each core can be implemented as a memory element that is separate from the memory element of each other core, or can be implemented at a larger multiport memory that supports multiple core memories. The memory 133 can be a multi-banked and multi-ported memory and as a result the processor core 121 and other resources can perform concurrent accesses. The core register file 134 can include storage locations that are directly accessible by the core pipeline 132, and other resources of core 121. The memory 133 can be a multi-ported memory, and is illustrated to include multiple task memory locations 171-174, wherein each task memory region is intended to be dedicated to a particular task.

The core cluster resources module 129, of core clusters 116, can include a plurality of circuit modules, including modules 148-149, that can support each core of the plurality of cores 120.

Figure 2:
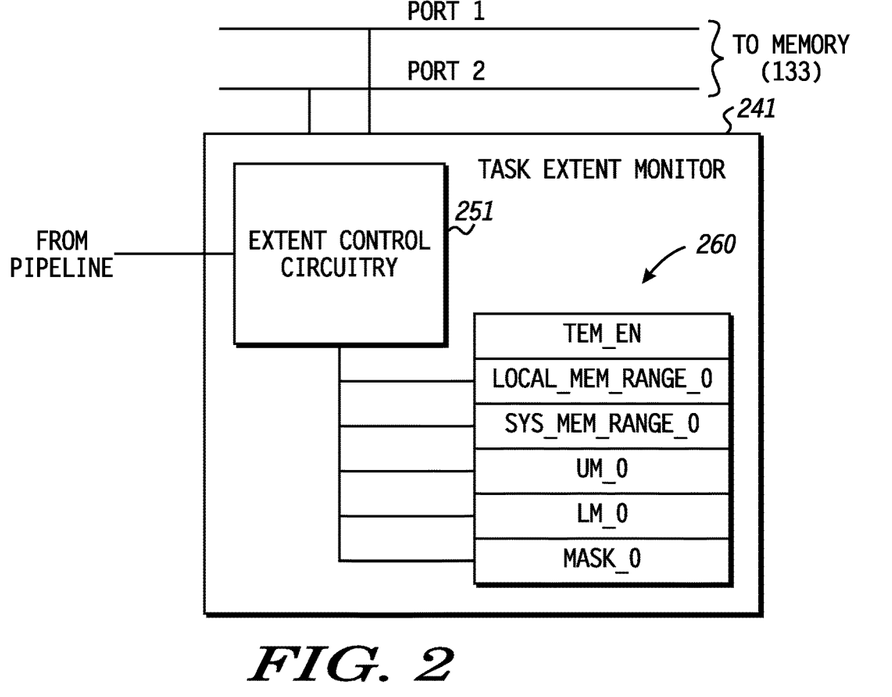
FIG. 2 illustrates, in block diagram form, a portion of the data processor system of FIG. 1 in accordance with at least one embodiment of the present disclosure.

FIG. 2 illustrates a task access extent monitor 241 that can correspond to a particular embodiment of one of the core resources 141-143. The task access extent monitor 241 includes extent control circuitry 251 connected to storage locations 260 and to the access ports, PORT1 and PORT2, of memory 133. In addition, the extent control circuitry 251 can be connected the pipeline 132.

The storage locations 260 can reside with the core resources 131, or be storage locations of core register file 134. It will be appreciated that for clarity the set of storage locations primarily associated with a particular task, TASK0, is illustrated at FIG. 2, and that storage locations 260 can also include similar sets corresponding to each of the other tasks being handled by a processor core.

The storage location labeled TEM_EN can be user programmable, and stores information that enables/disables task access extent monitoring for individual tasks by the extent control circuitry 251. For example, the storage location TEM_EN can include a field TEM_EN0 that when asserted enables task access extent monitoring for Task0, and when negated disables task access extent monitoring for Task0.

The storage location labeled LOCAL_MEM_RANGE_0 stores information indicating the location of Task0's private local memory, which will typically be a memory local to Task0's processor. The storage location labeled SYS_MEM_RANGE_0 stores information indicating the location of Task0's assigned global memory, which will typically be a memory that is not local to Task0's processor, such as memory 155. The values stored at SYS_MEM_RANGE_0 and LOCAL_MEM_RANGE_0 can be fixed or user programmable values. When user programmable, the values can be set by execution of a system-level task during startup, by execution of the workflow scheduler 113 at the time the task is assigned to core 121, by execution of the task itself, and the like. During operation of Task0, its assigned system memory, as indicated at storage location SYS_MEM_RANGE_0, can be copied to a local memory, as indicated at storage location LOCAL_MEM_RANGE_0, to facilitate more efficient access.

The storage locations UM_0 and LM_0 store information identifying the most extreme addresses of Task0's private local memory that have been modified (the modified most-extreme addresses) since the original DMA operation was performed to bring in a temporary private copy of a region of the global memory. In particular, the storage location labeled LM_0 stores information indicating the lower-most address of Task0's private local memory that has been accessed by a write operation (the modified lower-most address); and the storage location labeled UM_0 stores information indicating the upper-most address of Task0's private local memory that has accessed by a write operation (the modified upper-most address). It will be appreciated, that the label associated with a storage location can also be used to refer to the values stored at the storage location. For example, the statement "the lower-most address LM_0" is understood to refer to the value stored at location LM_0.

The storage location labeled MASK_0 stores information indicating portions of Task0's private local memory that are to be monitored by the extent control circuitry 251. The information stored at MASK_0 can be user programmable information used to specify one or more sub-ranges of the Task0's private local memory to be excluded from monitoring by the extent control circuitry 251. For ease of description below, unless stated otherwise, it is presumed that all of Task0's private local memory is monitored.

Figure 3:
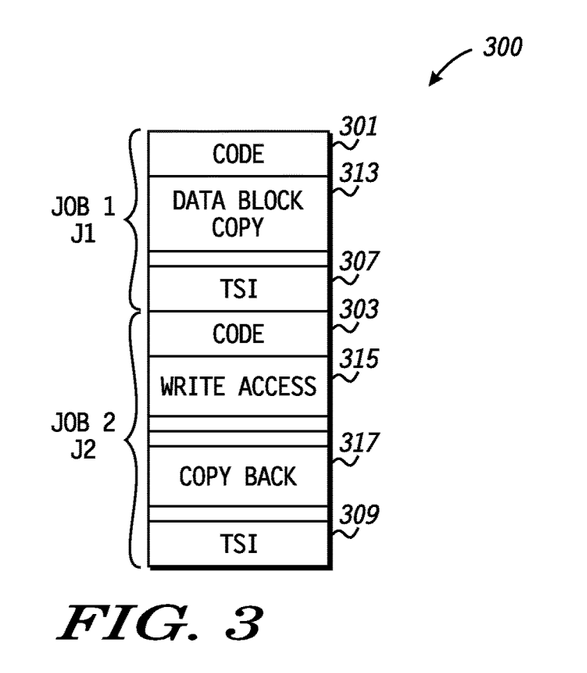
FIG. 3 illustrates the set of instructions of a task executed in a processor core of the data processor system of FIG. 1 in accordance with at least one embodiment of the present disclosure.

According to a particular embodiment, it can be the responsibility of Task0's task program to include one or more generic instructions that are used to initialize the storage locations 260 and to effectuate copying the private memory by configuring DMA 152. FIG. 3 illustrates a task program for a task, such as Task0, having two jobs, J1 and J2. The code portion 301 for job J1 can include instructions that initialize locations TEM_EN, UM_0 and LM_0 in anticipation of one or more regions of the task's assigned global memory being copied into local memory from a remote memory. According to an embodiment, UM_0 and LM_0 are initialized by storing an identical value, such as zero (0), at both locations, thereby indicating Task0's private memory has not been modified since being copied to local memory, e.g., no write has occurred.

A data block copy portion 313 of the task program in job J1 includes one or more instructions that cause the processor core 121 to copy the task's assigned memory data from a remote memory to a local memory. For example, the data block copy portion 313 can initiate a DMA data transfer request for the DMA controller 152 to transfer the assigned memory from the remote memory 155 to the local core memory 133. For example, the data block copy portion 313 can include instructions that access the source information for a DMA transfer from storage location SYS_MEM_RANGE_0 and the destination information for the DMA transfer 152 from storage location LOCAL_MEM_RANGE_0. This source and destination information is provided to DMA controller 152.

When the transfer is initiated, the DMA controller 152 will respond by transferring the requested block of data from the remote memory 155, which is accessible to all cores, to a task memory of the local core memory 133 for subsequent access and possible modification by the requesting task. It will be appreciated that the instruction discussed above that initialize the UM_0 and LM_0, storage locations can instead be considered to be part of the data block copy portion 313, and can be executed before or after the DMA transfer is initiated.

According to a particular embodiment, a task switch can occur once the DMA transfer is initiated to allow another task to execute while the DMA data transfer is being completed. As illustrated in FIG. 3, a task switch instruction (TSI) 307 which occurs at the end of job J1 is illustrated, as will be better understood with reference to the timing diagram of FIG. 4.

Figure 4:
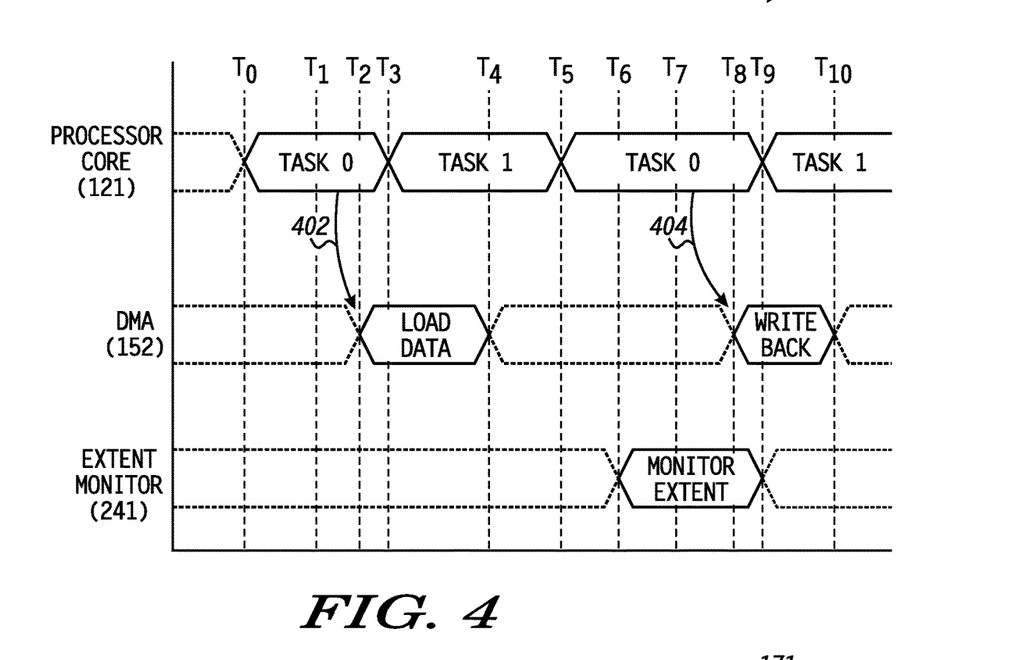
FIG. 4 illustrates a timing diagram for signals associated with a processor core, a direct memory access controller, and an access extent monitor of the data processor system of FIG. 1 in accordance with at least one embodiment of the present disclosure.

FIG. 4 illustrates a timing diagram 400 for operation of the data processor system of FIG. 1 in accordance with at least one embodiment of the present disclosure. In particular, a first signal indicates operational state information for processor core 121, a second signal indicates operational state information for DMA 152, and a third signal indicates operational state information the extent monitor 241.

Prior to time T0 each of the processor core 121, DMA 152, and extent monitor 241 are not active, with respect to the present discussion, and are therefore illustrated with dashed lines. At time T0, the timing signal for the processor core 121 transitions from being inactive to executing job J1 of Task0 (represented by solid lines).

At time T1, execution of the data block copy portion 313 of FIG. 3 begins, which causes the processor core 121 to configure the DMA controller 152 to copy a block of working memory in Task0's assigned global memory to local memory, as indicated by arrow 402.

At time T2, in response to the DMA request, the timing signal for the DMA 152 transitions from being inactive to active to indicate the DMA 152 is copying the block of data defined by the address range in the data transfer request. This transfer occurs between T2 and T4.

At time T3, which is subsequent to initiation of the data block copy portion 313, a task switch occurs in response to the instruction TSI 307, causing core 121 to begin execution of a different task at time T3, which is illustrated to be Task1 in FIG. 4. Execution of Task1, or another task, can continue concurrently with DMA 152 transferring data from Task0's assigned global memory, which completes the block transfer at time T4.

At time T4, the timing signal for the DMA 152 transitions from active to inactive to indicate that the DMA 152 has completed the data transfer request. The processor core 121 can then be notified by the DMA 152 that the data transfer has been completed, and in response, Task0 can be subsequently re-enabled for execution, which allows processor core 121 to resume executing Task0 in response to a next task switch instruction occurring in Task1. In this example, the processor core 121 transitions from executing Task1 to executing job J2 of Task0 at time T5.

Upon resuming execution of Task0, at time T5, corresponding to the interval labeled Job 2 in FIG. 3, access extent monitoring may or may not be enabled for Task0. For example, according to FIG. 4, access extent monitoring begins at time T6, which indicates that monitoring of Task0 was enabled at time T6 by an appropriate write to storage location TEM_EN. Once extent monitoring is enabled, extent control circuitry 251 monitors accesses at the various ports of memory 133 to determine when a location in Task0's private local memory is being modified. For example, the extent control circuitry 251 can monitor each access to memory 133, at PORT1 and PORT2, to determine when a write access occurs. In response to detecting a write access, compare circuitry, of the extent control circuitry 251, compares the address of the write access to the address range of Task0's private local memory, which is stored at location LOCAL_MEM_RANGE_0, to determine if the current write access is to the private local memory of Task0. If so, the extent control circuitry can compare the address of the write access to mask information stored at MASK_0 to determine if the write address to the private memory is to be monitored. The stored value in MASK_0 may be used to qualify accesses to only a pre-determined portion of task local memory for access extent monitoring, such that either a subset, or all of a task's private local memory address range is monitored. By way of example, it is presumed the entire private memory of task0 is to be monitored in this specific example.

When the write access does belong to task0, the extent control circuitry 251 does one of the following: stores the address of the current write access at locations UM_0 and UL_0 if the write access is the first write access to Task0's private local memory; stores the address of the current write access at location UM_0 if the current address is greater than the address currently stored at location UM_0; stores the address of the current write access at location LM_0 if the address is less than the address currently stored at location LM_0; or does nothing if the current address is between the addresses stored at LM_0 and UM_0.

As the processor core 121 executes additional write access instructions during the execution of Task0 in job J2, the extent control circuitry 251 continues to monitor each of the write accesses to determine whether they are to addresses in the range at location LOCAL_MEM_RANGE_0, and therefore need to be evaluated to determine if UM_0 and LM_0 need to be updated to reflect a new range of modified addresses for task0's private local memory, e.g., memory 171. Thus, the extent control circuitry 251 can dynamically track an address range, referred to as a modified address range, of Task0's private local memory that includes all memory locations that have been modified since being copied from remote memory. This dynamically tracked region can be utilized during a write-back operation at time T7 to only write that range of memory back to remote memory that has changed.

At time T7, job 2 of task 0 on the processor core 121 executes the block copy back portion 317 of FIG. 3, which causes the processor core 121 to initialize DMA 152, as indicated by arrow 404, to copy-back only the modified address range Task0's private local memory 171. For example, the modified address range can be the range between the most-extreme address locations. For example, the range between the lower-most address, LM_0, and the upper-most address, UM_0. Thus, the copy back portion 317 can include one or more instructions that cause the processor core 121 to copy only a monitored subset of the task's private local memory to the remote memory. For example, the data block copy portion 317 can initiate a DMA data transfer request by the DMA controller 152 to transfer the private memory from the local memory 171 to the remote memory 155.

The data block copy portion 317 can include instructions that access storage locations UM_0 and LM_0 to determine the source addresses for a DMA transfer, and access the information at storage location SYS_MEM_RANGE_0 to determine the destination address for the block of source memory. This source and destination information is provided to DMA controller 152. By use of the access extent monitoring mechanism, the amount of memory transferred back to the global memory region for the task can be minimized, based on the lower-most and upper-most address values which bound potentially modified data while the task was operating on the entire block of memory. In some situations, only a very small portion of the overall working copy of the block need be updated back to the global memory. Advantageously, the memory which is written back to the global memory consists of a contiguous range of addresses, facilitating a simple DMA transfer of a single block of memory of varying size. Unlike a system which requires that individual elemental memory locations be updated from local memory to global memory, the access extent monitoring mechanism provides for returning a single contiguous region, which is generally much smaller than the overall original block read by the DMA, to global memory from local memory.

At time T8 of the timing diagram 400, the timing signal for DMA 152 transitions from not being active (represented by the dashed lines) to indicating that the DMA 152 is copying back the modified data.

At time T9, the timing signal for the processor core 121 can transition from Task0 to Task1 to indicate that the processor core 121 has executed the task switch instruction 309 in job J2 of Task0. It will be appreciated that an instruction that indicates the end of Task0 can be implemented instead of task switch instruction 309.

At time T10, the timing signal for the DMA 152 transitions from copying back the modified data to not being active to indicate that the copy back has been completed.

Figure 5:
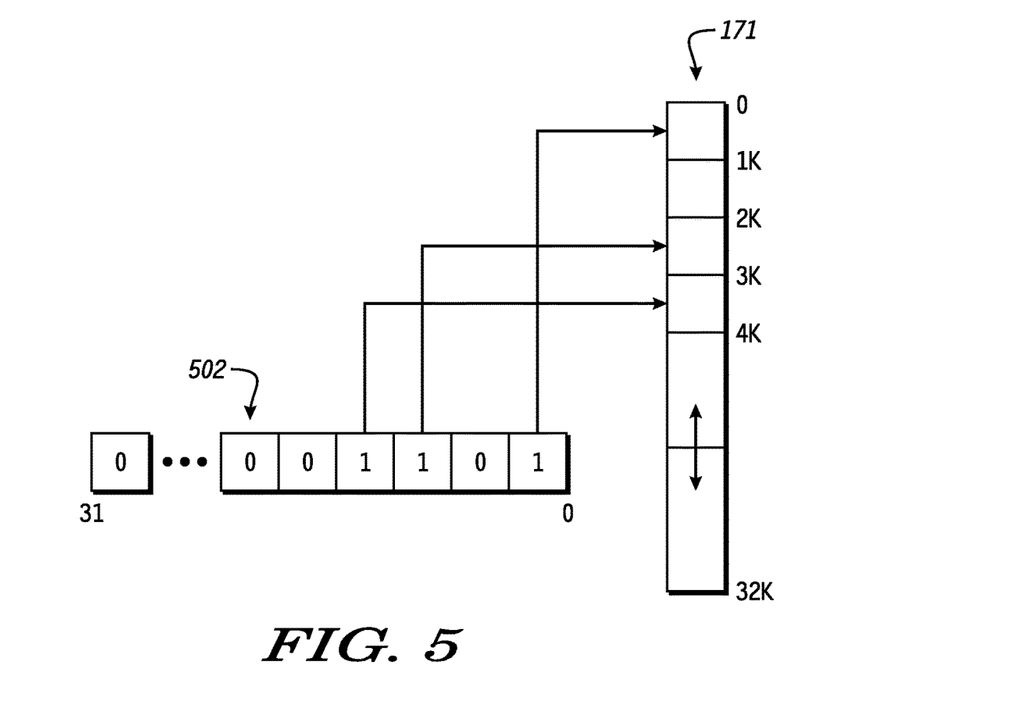
FIG. 5 illustrates a register to store a base address and mask of a task memory location within the data processor system of FIG. 1 in accordance with at least one embodiment of the present disclosure.

FIG. 5 illustrates a particular embodiment of the storage location MASK_0 of FIG. 2. In the illustrated embodiment, each bit of storage location 502 is mapped to a sub-range of Task0's private memory, such that each individual sub-range of a Task's private memory can be included or excluded from being monitored. For example, a sub-region associated with a bit value of zero (0) would not be evaluated by the extent control circuitry in response to a write access. Note, however, that such a sub-region could still be subject to a write back operation, if memory addresses on both sides of the sub-region are modified. As illustrated, bits 0, 2, and 3 of register 502 are asserted, e.g., set to one (1), while bits 1 and 4-31 can be negated, e.g., set to zero (0), as shown in FIG. 5. In this example, bits 1 and 4-31 being negated can mask the regions of task memory location 171 that correspond to these bits from the extent control circuitry 251. Therefore, the register 502 of extent monitor 241 can utilize a base address of task memory location 171 and the mask bits to predefine that the extent control circuitry 251 only monitors address ranges within task memory location 171 that corresponds to the 0-1 Kilobyte range and 2-4 Kilobytes range of the task memory location 171, as shown in FIG. 5.

It will be appreciated, that extent control circuitry 251 is separate from core pipeline 132, e.g., operation of the extent control circuitry 251 is not implemented by instructions executed at core pipeline 132. For example, extent control circuitry 251 can be a state machine dedicated to monitoring accesses to memory 133, a program executed at a pipeline other than core pipeline 132 that monitors access to memory 133, or other circuitry that is separate from the core pipeline 132. Thus, operation of the extent control circuitry does not interfere with execution of the task it is monitoring. It will be appreciated that extent monitoring of a task's private local memory using circuitry that operates independent of the core executing the task allows for efficient memory transfer of only those portions of private memory that have changed, and does so without affecting the rate at which the task is executed by its processor core. This is especially advantageous in applications with many tasks that are very short in duration, e.g., by virtue of not executing many instructions, as monitoring the extent of memory changes in task software would require significant overhead relative to tasks having a short duration. It will be further appreciated that many variations to the above described extent monitoring can be implemented.

For example, instead of task software being responsible for initializing the locations UM_0 and LM_0, the extent control circuitry 251 can initialize these storage locations for a particularly task in response to determining that that task's private global memory has been copied to its local memory location. For example, in response to a task instruction writing to a register that is monitored by the extent control circuitry 251, or by the extent control circuitry otherwise determining a task's private memory has been copied to local memory, the extent control circuitry can initialize the values UM_0 and UM_1, and enable extent monitor, instead of the task executing write accesses. In another example, a task instruction can write to a register that is monitored by the extent control circuitry 251 to indicate a particular task's private global memory is to be copied to its local memory, and, in response, the extent control circuitry 251 can initialize DMA 152, based on the information at storage locations 260, to effectuate the transfer, and initialize the values UM_0 and UM_1. Similarly, the extent control circuitry can determine when a write back is to occur, such as by receiving notification from the task software, and in response initialize DMA 152 based upon the information at storage locations 260. In response to a write-back, the extent control circuitry 251 can also disable further extent monitoring of a particular task by negating a corresponding bit of storage location TEM_EN.

In another embodiment, instead of the extent control circuitry 251 evaluating all write accesses to the task's private, when enabled, a dedicated "monitored write" instruction can be supported by the pipeline 132 that implicitly indicates that its associated write access is to be evaluated by the extent control circuitry 251. For example, a write implemented by a monitored write instruction can provide an indicator to the extent control circuitry 251 that results in its address being compared to the private memory LOCAL_MEM_RANGE_0 to determine if the write is within the tasks private memory location, and if so, compared to the UM_0 and LM_0. Conversely, a "normal write" instruction would not provide such and indicator, and the extent control circuitry would not be monitored by the extent control circuitry.

In the described embodiments, a hardware DMA controller 151 has been described. However, in another embodiment a software DMA controller can be implemented that transfers blocks of data using the information stored at the storage locations 260. In another embodiment, the extent control circuitry 251 can maintain multiple extent pairs for each task's memory. For example, extent control circuitry can dynamically monitor write accesses to private memory of a task to identify two regions of memory that contain all modified storage locations. Maintaining multiple pairs can reduce the total amount of data that needs to be written-back. The use of multiple extent pairs can be especially useful when a mask, such as that described at FIG. 5, indicates that discontinuous memory regions of private memory are to be monitored. For example, with respect to FIG. 5, one extent monitor pair can identify the region of memory range 0-1K to be written back, and another extent monitor pair can identify the region of memory range 2 k-4 k to be written back.

In the described embodiments, each task capable of being executed in the processor core 121 is described as having dedicated set of storage locations in the plurality of storage locations 260. In another embodiment, a pool of non-dedicated storage locations can be provided, such that a set of the pool can be dedicated to a particular task as needed, and subsequently released. In such an embodiment, it can further be possible for the extent control circuitry to allocate multiple extent pairs to a single task if it is determined doing so will result in a sufficiently more efficient transfer. For example, each register set can have an indicator identifying which task it is supporting, and a task could be assigned to multiple register sets. For example, the processor core 121 could include fewer or more sets of storage locations than the number of tasks that the core can support, and the extent control circuitry 251 can allocate the sets as needed.

According to another embodiment, a task's modified address range can be based on only one extreme-most address. For example, only the upper-most extreme address needs to be monitored, wherein the write back range would extend from the beginning address of the private memory through the upper-most modified address. Similarly, only the lower-most address would need to be modified.

In one embodiment, a method includes receiving a block of received data, for a first task, from a global memory location that is not local to a core executing a plurality of tasks, including the first task. The method further includes storing the block of received data at a first task memory location, the first task memory location being local to the core. The method also includes determining a first modified most-extreme address of the first task memory location during a duration of time. The method further includes that after the duration of time, writing back a portion of the first task memory location to a portion of the global memory location, the portion based upon the first modified most-extreme address.

In an embodiment, the first modified most-extreme address is a modified upper-most address. In an embodiment, the first modified most-extreme address is a modified lower-most address. In an embodiment, the method further includes determining a second modified most-extreme address of the first task memory location during the duration of time. In this embodiment, the first most-extreme address and the second most-extreme address define an upper and a lower address of a modified memory location at which all modified data stored in the first task memory location is stored. The method also includes writing back further comprises writing back data stored at less than the entire first task memory location based upon the first and second modified most-extreme addresses.

In an embodiment, the method includes releasing the first task memory location from being exclusive to the first task subsequent to the write back. In an embodiment, determining the first modified most-extreme address includes: in response to determining, during the duration of time, that a write operation is to the task memory location, updating a first storage region storing a previously identified most-extreme address in response to the write operation being to a more extreme address than the previously identified most-extreme address. In an embodiment, the method also includes storing, at a user programmable location, an upper most-extreme address and a lower most-extreme address for a modified address location of the first task memory location. In this embodiment, the first modified most-extreme address is one of the upper most-extreme address and the lower most-extreme address.

In one embodiment, a method includes that in response to execution of a first task at a first processor core, providing a request to copy a block of data of a particular size from a location of a first memory to a location of a second memory. In this embodiment, the second memory is accessed by the first task using fewer clock cycles than the first memory is accessed by the first task. The method also includes inhibiting execution of the first task by the first processor core in response to providing the request to copy the block of data. The method further includes enabling execution of a second task at the first processor core in response to inhibiting the execution of the first task. The method also includes copying the block of data from the location of the first memory to the location of the second memory. The method further includes that in response to determining at least a portion of the block of data has been copied to the location of the second memory, enabling the execution of the first task. The method also includes monitoring write accesses of the first task to the location of the second memory to determine a modified upper-most address and a modified lower-most address of the location of the second memory.

In an embodiment, the method also includes determining a portion of data to be written back from the location of second memory to a corresponding location of first memory. In this embodiment, the portion is defined by the modified upper-most address and the modified lower-most address, and the portion is less than the particular size. In an embodiment, the write access to the location of the second memory meets a masking criteria indicated by a mask storage location. In an embodiment, the location of the second memory is exclusive to the first task.

In an embodiment, the execution of the second task is executed concurrently with copying the block of data from the first memory to the second memory. In an embodiment, the first memory is a global memory accessible by a plurality of processor cores that includes the first processor core, and the second memory is a local memory of the first processor core dedicated to a particular task. In an embodiment, determining the portion of data to be written back is in response to executing a task switch instruction of the first task.

In one embodiment, a data processor system includes a local memory of a processor core configured to store a block of data at a task memory location that is exclusive to a particular task of the processor core during a duration of time. The processor core is configured to write to the task memory location during execution of the particular task. The data processor system further includes an extent monitor configured to monitor write operations being executed by the processor core to the task memory location to determine a first most-extreme address of the task memory location modified by the execution of the particular task during the duration of time.

In an embodiment, the extent monitor is further configured to write back data stored at less than the entire task memory location to a shared memory location based on the first most-extreme address. In an embodiment, the extent monitor is further configured to determine whether the write operation is to the task memory location, to update the first most-extreme address in response to the write operation being to an address outside of an address range defined by the first most-extreme address, and to replace the first most-extreme address with the updated first most-extreme address.

In an embodiment, the extent monitor is further configured to monitor a predetermined range within the task memory location. In this embodiment, the predetermined range is based upon a mask stored in a storage of the extent monitor. In an embodiment, the first most-extreme address is a smallest address for the block of data. In an embodiment, the extent monitor is further configured to write-back the block of data in response to completion of the particular task.

It will be appreciated that many other variations can be envisioned. For example, the connections described herein may be any type of connection suitable to transfer signals from or to the respective nodes, units or devices, for example via intermediate devices. Accordingly, unless implied or stated otherwise the connections may for example be direct connections or indirect connections.

It is to be understood that the architectures depicted herein are merely exemplary, and that in fact many other architectures can be implemented which achieve the same functionality. Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative examples may include multiple instances of a particular operation, and the order of operations may be altered in various other examples. For example, the tasks do not have to be packetized tasks, e.g., tasks associated with a specific packet. Furthermore, the devices may be physically distributed over a number of apparatuses, while functionally operating as a single device.

What is claimed is:

1. A method comprising:
   receiving a block of received data, for a first task, from a global memory location that is not local to a core executing a plurality of tasks, including the first task;
   storing the block of received data at a first task memory location, the first task memory location being local to the core;
   determining a first modified most-extreme address of the first task memory location during a duration of time;
   storing, at a user programmable location, an upper most-extreme address and a lower most-extreme address for a modified address location of the first task memory location, wherein the first modified most-extreme address is one of the upper most-extreme address and the lower most-extreme address; and
   after the duration of time, writing back a portion of the first task memory location to a portion of the global memory location, the portion based upon the first modified most-extreme address.

2. The method of claim 1, wherein the first modified most-extreme address is a modified upper-most address.

3. The method of claim 1, wherein the first modified most-extreme address is a modified lower-most address.

4. The method of claim 1, further comprising:
   determining a second modified most-extreme address of the first task memory location during the duration of time, wherein the first most-extreme address and the second most-extreme address define an upper and a lower address of a modified memory location at which all modified data stored in the first task memory location is stored; and
   writing back further comprises writing back data stored at less than the entire first task memory location based upon the first and second modified most-extreme addresses.

5. The method of claim 1, further comprising:
   releasing the first task memory location from being exclusive to the first task subsequent to the write back.

6. The method of claim 1, wherein determining the first modified most-extreme address comprises:
   in response to determining, during the duration of time, that a write operation is to the task memory location, updating a first storage region storing a previously identified most-extreme address in response to the write operation being to a more extreme address than the previously identified most-extreme address.

7. A method comprising:
   in response to execution of a first task at a first processor core, providing a request to copy a block of data of a particular size from a location of a first memory to a location of a second memory, wherein the second memory is accessed by the first task using fewer clock cycles than the first memory is accessed by the first task;
   inhibiting execution of the first task by the first processor core in response to providing the request to copy the block of data;
   enabling execution of a second task at the first processor core in response to inhibiting the execution of the first task;
   copying the block of data from the location of the first memory to the location of the second memory;
   in response to determining at least a portion of the block of data has been copied to the location of the second memory, enabling the execution of the first task;
   monitoring write accesses of the first task to the location of the second memory to determine a modified upper-most address and a modified lower-most address of the location of the second memory; and
   storing, at a user programmable location, an upper most-extreme address and a lower most-extreme address for a modified address location of the first task memory location, wherein the first modified most-extreme address is one of the upper most-extreme address and the lower most-extreme address.

8. The method of claim 7, further comprising:
   determining a portion of data to be written back from the location of second memory to a corresponding location of first memory, the portion being defined by the modified upper-most address and the modified lower-most address, and the portion being less than the particular size.

9. The method of claim 7, wherein the write access to the location of the second memory meets a masking criteria indicated by a mask storage location.

10. The method of claim 7, wherein the location of the second memory is exclusive to the first task.

11. The method of claim 7, wherein the execution of the second task is executed concurrently with copying the block of data from the first memory to the second memory.

12. The method of claim 7, wherein the first memory is a global memory accessible by a plurality of processor cores that includes the first processor core, and the second memory is a local memory of the first processor core dedicated to a particular task.

13. The method of claim 7, wherein determining the portion of data to be written back is in response to executing a task switch instruction of the first task.

14. A data processor system comprising:
a local memory of a processor core configured to store a block of data at a task memory location that is exclusive to a particular task of the processor core during a duration of time;
the processor core configured to write to the task memory location during execution of the particular task;
an extent monitor configured to monitor write operations being executed by the processor core to the task memory location to determine a first most-extreme address of the task memory location modified by the execution of the particular task during the duration of time; and
a user programmable location, wherein the extent monitor is configured to store an upper most-extreme address and a lower most-extreme address for a modified address location of the first task memory location, wherein the first most-extreme address is one of the upper most-extreme address and the lower most-extreme address.

15. The data processor system of claim 14, wherein the extent monitor is further configured to write back data stored at less than the entire task memory location to a shared memory location based on the first most-extreme address.

16. The data processor system of claim 14, wherein the extent monitor is further configured to determine whether the write operation is to the task memory location, to update the first most-extreme address in response to the write operation being to an address outside of an address range defined by the first most-extreme address, and to replace the first most-extreme address with the updated first most-extreme address.

17. The data processor system of claim 14, wherein the extent monitor is further configured to monitor a predetermined range within the task memory location, wherein the predetermined range is based upon a mask stored in a storage of the extent monitor.

18. The data processor system of claim 14, wherein the first most-extreme address is a smallest address for the block of data.

19. The data processor system of claim 14, wherein the extent monitor is further configured to write-back the block of data in response to completion of the particular task.

* * * * *